Figure 1:
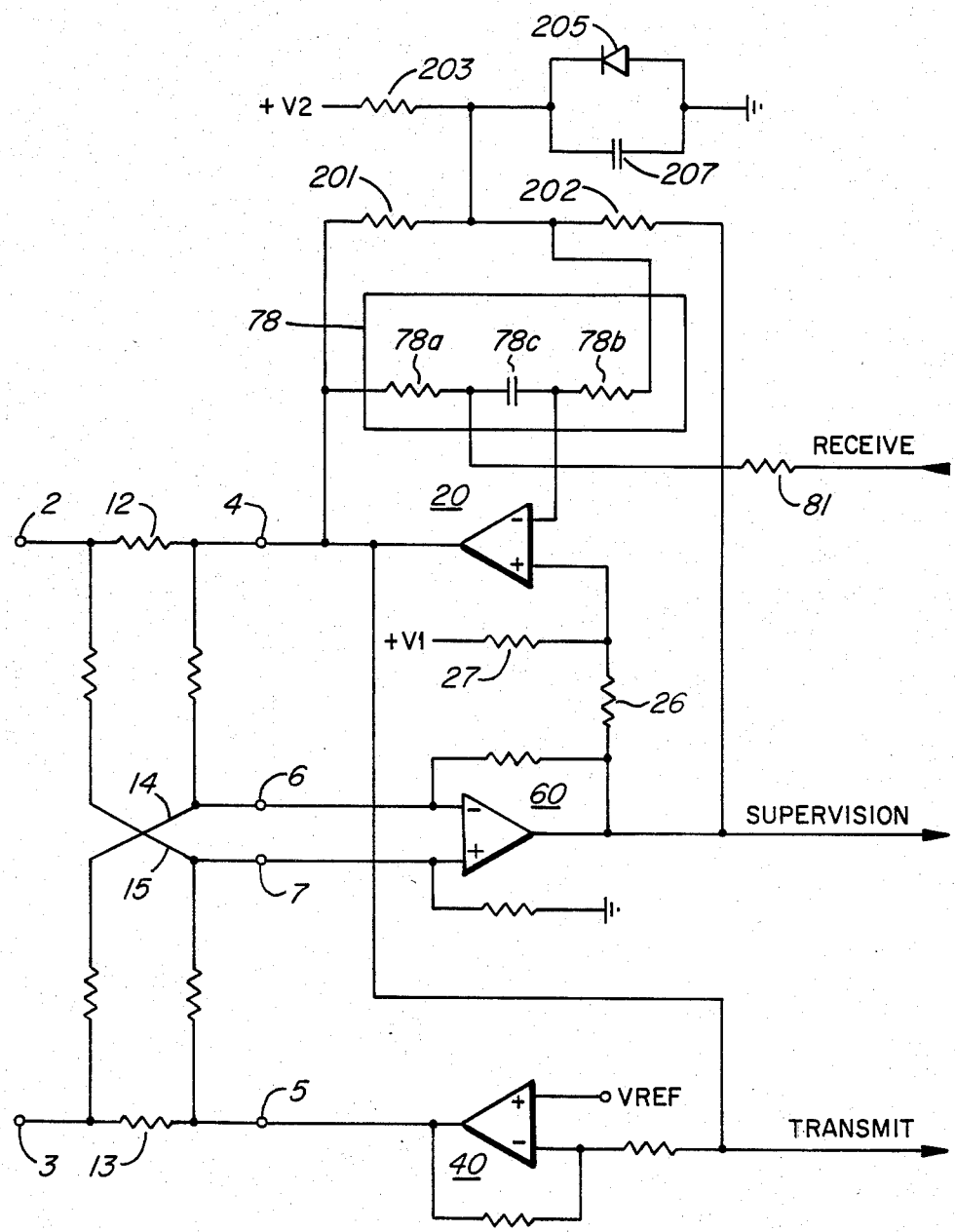

United States Patent [19]

Rosenbaum et al.

[11] Patent Number: 4,532,381
[45] Date of Patent: Jul. 30, 1985

[54] ACTIVE IMPEDANCE LINE FEED CIRCUIT

[75] Inventors: Stanley D. Rosenbaum, Ottawa; Zdenek Holy, Nepean, both of Canada

[73] Assignee: Northern Telecom Limited, Montreal, Canada

[21] Appl. No.: 579,266

[22] Filed: Feb. 13, 1984

[51] Int. Cl.³ .................... H04M 19/00; H04B 3/00
[52] U.S. Cl. ........................ 179/18 FA; 179/16 F; 179/77
[58] Field of Search ............... 179/18 FA, 16 F, 70, 179/77, 16 A, 16 AA, 81 R, 170 NC

[56] References Cited

U.S. PATENT DOCUMENTS

| | | | |
|---|---|---|---|
| 4,119,806 | 10/1978 | Baratin | 179/18 FA |
| 4,283,604 | 8/1981 | Chambers, Jr. | 179/70 |
| 4,317,963 | 5/1982 | Chea, Jr. | 179/77 |
| 4,322,586 | 3/1982 | Mein et al. | 179/170 NC |
| 4,359,609 | 11/1982 | Apfel | 179/16 F |
| 4,387,273 | 6/1983 | Chea, Jr. | 179/16 F |
| 4,431,868 | 2/1984 | Bolus et al. | 179/18 FA |
| 4,431,869 | 2/1984 | Sweet | 179/77 |
| 4,472,608 | 9/1984 | Beirne | 179/170 NC |
| 4,503,289 | 5/1985 | Spires | 179/16 F |

*Primary Examiner*—Gene Z. Rubinson
*Assistant Examiner*—Elio DiVito
*Attorney, Agent, or Firm*—J. E. Moorhouse

[57] ABSTRACT

Normal operating range of an active impedance line feed circuit is extended to at least that of a prior art passive resistance line feed circuit. The active impedance line feed circuit includes tip and ring feed resistors in series with outputs of tip and ring amplifiers for coupling a.c. signals to a two wire communication line with an effective source impedance as defined by an a.c. feedback network in response to differential currents in the communication line. Effective output direct current incremental resistances of the tip and ring amplifiers are controlled by a d.c. control circuit connected across the tip amplifier. In an instant of an OFF HOOK communication line of less than a certain resistance a predetermined constant direct current is supplied by controlling the output direct current incremental resistances to be high. In an instant of the communication line resistance being too high, as in the case of a longer line, the output direct current incremental resistances of the tip and ring amplifiers are controlled to approach a few ohms such that at least a minimum energizing direct current is suppliable from the active impedance line feed circuit over an extended range of communication line.

7 Claims, 2 Drawing Figures

ACTIVE IMPEDANCE LINE FEED CIRCUIT

The invention relates to active impedance line feed circuits as for example disclosed in any of copending applications Ser. No. 386,871 filed June 10, 1982 entitled "Active Impedance Line Feed Circuit"; Ser. No. 406,115 filed Aug. 6, 1982 entitled "Active Impedance Transformer Assisted Line Feed Circuit"; and Ser No. 525,398 filed Aug. 22, 1983 entitled "Active Impedance Transformer Assisted Line Feed Circuit with Supervision Filtering".

BACKGROUND OF THE INVENTION

A typical active impedance line feed circuit includes tip and ring amplifier circuits being controlled to exhibit predetermined a.c. impedance and d.c. feed resistance characteristics for the purpose of supplying energizing current for a two wire communication line. These characteristics are determined by respective a.c. and d.c. feedback networks associated with an amplifier circuit within the line feed circuit. In one example of the line feed circuit, application Ser. No. 386,871, a diode is combined with the d.c. feedback network to limit the direct energizing current in the case of a short and hence low resistance communication line. Another feature of the exemplified line feed circuits of the previously mentioned application is that through selective biasing the tip and ring amplifiers are caused to remain in linear operation throughout OFF HOOK and ON HOOK states of the communication line. This has the advantage of conveniently permitting a.c. signal testing of the communication line via the line feed circuit during the ON HOOK state. However this biasing has the disadvantage of making it appear that the communication line is energized from a battery of lesser potential than is actually the case. In this respect the exemplified line feed circuits of the previously mentioned applications are at a disadvantage when compared to a purely resistive feed as exemplified by V. V. Korsky in U.S. Pat. No. 4,103,112 issued July 25, 1978 to the present assignee. The maximum length and hence resistance of the communication line to which a specified minimum energizing current can be supplied is less than in the case of the Korsky line circuit.

In the most recent of the previously mentioned patent applications, a line feed circuit is exemplified wherein the a.c. and d.c. feedback networks are directly connected across the tip amplifier whereby circuit economies accrue.

In each of the active impedance line feed circuits of the previous applications, a problem remains as to providing at least a minimum energizing direct current for operation of a communication line of a maximum permissible resistance and at the same time providing for ON HOOK a.c. signal testing of the communication line.

SUMMARY OF THE INVENTION

It is an object of the invention to provide an active impedance line feed circuit which is operative to supply at least a minimum operating current to a communication line having an OFF HOOK resistance of up to a maximum resistance corresponding to that being operable from a conventional passive resistance line feed circuit.

It is a further object of the invention that the line feed circuit exhibit a constant and predetermined impedance characteristic for voice band a.c. signals during both OFF HOOK and ON HOOK states of the communication line.

An active impedance line feed circuit in accordance with the invention includes a pair of tip and ring line feed terminals for connection to the communication line and a receive signal terminal for receiving a.c. signal information destined for the communication line. Tip and ring amplifiers each have an output for conducting tip and ring electrical currents respectively. A resistance network includes tip and ring feed resistors of similar ohmic values. The tip feed resistor is connected in series with the output of the tip amplifier and the tip terminal. The ring feed resistor is connected in series with the output of the ring amplifier and the ring terminal. The resistance network also includes tip and ring voltage dividers defining tip and ring voltage taps respectively. A control circuit includes an output and also includes a differential input connected across the tip and ring voltage taps. In combination with one of the tip and ring amplifiers, an a.c. feedback network is connected between the output and an inverting input of the amplifier, and a d.c. feed control network is connected between the output and the inverting input of the amplifier. The d.c. feed control network includes a device connected at a junction of first and second resistors for establishing a voltage limit at the junction, an a.c. conductive device connected between an a.c. ground and the junction, and a third resistor being connected to a voltage supply and the junction for biasing the potential of the junction away from the voltage limit. A first resistive signal path is connected between the output of the control circuit and a non-inverting input of the tip amplifier. A second resistive signal path which includes the second resistor, is connected between the output of the control circuit and the junction in the d.c. control feed network.

When the active impedance line feed circuit is operated with a communication line of less than a certain resistance in an OFF HOOK state the junction of the d.c. feed control network is clamped at the voltage limit and the d.c. energizing current conducted by the tip and ring feed resistors is substantially constant. When the resistance of a communication line is a greater than the certain resistance, the junction is unclamped, causing control signals from the control circuit being of less than voice band frequency to be coupled in common mode to the amplifier via the first and second resistance signal paths. Having in mind that the amplifier exhibits typical common mode rejection characteristics it can be seen that the tip and ring amplifiers are thus caused to operate with effective output direct current incremental resistances approaching zero, thereby permitting at least a minimum direct energizing current to be supplied to a communication line of maximum permissible resistance. Selected biasing of the tip and ring amplifiers maintains the tip and ring amplifiers in linear operation in the ON HOOK state.

The invention is also a method of operating an active impedance line feed circuit wherein tip and ring amplifiers are maintained in linear operation and controlled in response to differential currents in a communication line to exhibit in series combination with respective tip and ring feed resistors a predetermined characteristic source impedance, as defined by an a.c. feedback network in the active impedance line feed circuit, for coupling a.c. signals to the communication line. The method is characterized in that direct current incremental resistance characteristics at the outputs of the tip and ring amplifiers are controlled to be similar one with respect to the other and to provide in series with a power source a substantially constant predetermined direct energizing current for operation of the communication line. In an instant of a resistance of the communication line being too high to maintain the predetermined direct energizing current, as a consequence of a voltage available from the power source being insufficient, the apparent direct current incremental resistance characteristics at the outputs of the tip and ring amplifiers are controlled to approach zero ohms with respect to an apparent power source voltage corresponding to the available voltage from the power source less a minimum voltage required for the linear operation of the tip and ring amplifiers. In accordance with the method thus characterized a length of communication line being energizable, with at least a predetermined minimum direct energizing current from an active impedance line feed circuit, is extended.

INTRODUCTION OF THE DRAWINGS

Figure 2:
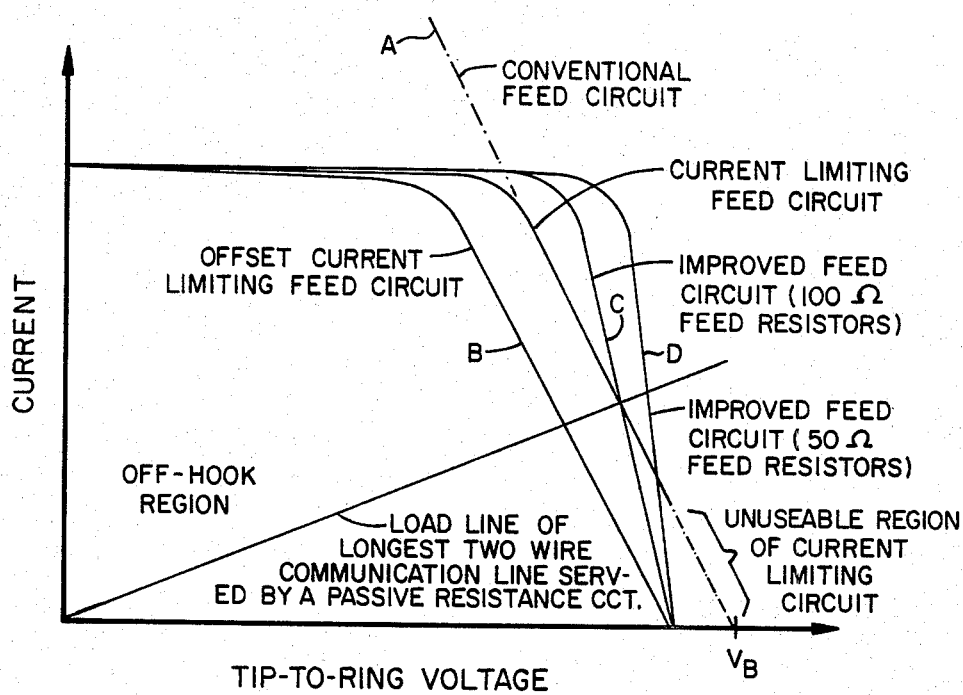

An example embodiment of an active impedance line feed circuit is described with reference to the accompanying drawings in which:

FIG. 1 is a schematic diagram of an active impedance line feed circuit in accordance with the invention; and FIG. 2 is a graphical illustration of operating characteristics of various line feed circuits including the active impedance line feed circuit in FIG. 1.

DESCRIPTION OF THE EXAMPLE EMBODIMENT

Many aspects of the active impedance line feed circuit in FIG. 1 are similar to examples of line feed circuits described in the previously mentioned patent applications. Therefore many of the circuit elements are labelled similarly. However circuit elements not of the same function or not introduced in any of the previous patent applications are labelled distinctly therefrom.

Referring to FIG. 1, a tip feed resistor 12 is connected in series with a tip terminal 2 and an output terminal 4 of a tip amplifier circuit 20. A ring feed resistor 13, of ohmic value similar to that of the tip feed resistor 12, is connected in series with a ring terminal 3 and an output terminal 5 of a ring amplifier circuit 40. The tip and ring amplifier circuits 20 and 40 are typically powered from a battery in a telephone system, not shown, common to a plurality of line circuits. A tip voltage divider 14 defines a tip voltage tap 6 and is connected in series between the terminals 4 and 3. A ring voltage divider 15, defines a ring voltage tap 7 and is connected in series between the terminals 2 and 5. A control circuit 60 includes a differential input connected across the voltage taps 6 and 7 as shown. An output of the control circuit 60 is connected to a supervision lead for providing supervisory signals to the associated telephone system. A first resistive signal path provided by a resistor 26 is connected between the output of the control circuit 60 and a non-inverting input of the tip amplifier circuit 20. A resistor 27 is connected between a positive voltage source +V1 and the non-inverting input of the tip amplifier circuit 20. The resistors 26 and 27 provide for attenuation and biasing of signals from the output of the control circuit 60. An a.c. feedback network 78 includes resistors 78a and 78b and a capacitor 78c which are connected as shown between the output and an inverting input of the tip amplifier circuit 20. The output of the tip amplifier circuit 20 is connected to an inverting input in the ring amplifier circuit 40, as shown. The output of the tip amplifier circuit 20 in addition provides a transmit lead for connection to an electronic hybrid circuit not shown, in the associated telephone system. A resistor 81 provides a receive path via the a.c. feedback network 78 for such signals from the electronic hybrid circuit, as are destined for the communication line.

A d.c. control feed circuit includes resistors 201 and 202 connected in series between the outputs of the tip amplifier circuit 20 and the control circuit 60. A resistor 203 is connected between the positive voltage source +V2 and a junction of the resistors 201 and 202. A unidirectional conductive device, in this case a diode 205, is connected as shown, in parallel with a capacitor 207 between ground and the junction of the resistors 201 and 202. A second resistive signal path is provided by the resistor 202 and the resistor 78b between the output of the control circuit 60 and the inverting input of the tip amplifier circuit 20 while the diode 205 is non-conductive.

The graphical illustration in FIG. 2 includes a vertical axis representing direct energizing current and a horizontal axis representing voltage as would be measured across the tip and ring terminals 2 and 3 during operation. A communication line typical of a telephone subscriber loop connected at the tip and ring terminals 2 and 3 will preferably draw an energizing current of about 40 milliamperes and not less than about 20 milliamperes while in the OFF HOOK state. A load line drawn from the intersection of the axis is representative of a communication line of about the maximum permissible resistance.

In operation, the communication line being connected across the tip and ring terminals 2 and 3 of an active impedance line feed circuit having an a.c. feedback network and a d.c. limiting feedback network but without the d.c. control feed circuit, would normally conduct a direct current as exemplified by line B in FIG. 2. This is in comparison to the direct current represented by line A which exemplifies the operating characteristics of a passive line feed circuit with 200 ohm tip and ring feed resistors. Line B illustrates two modes of operation in the active impedance line feed circuit. A first portion of the line B is of nearly zero slope and corresponds to a limited current mode wherein the incremental output direct current resistances of the tip and ring amplifier circuits 20 and 40 are very high. A second portion of the line B to the right of the first portion and of greater slope corresponds to an unlimited current mode wherein the incremental output direct current resistances of the tip and ring amplifiers 20 and 40 are much lower. A point of intersection of the line B with the horizontal axis of FIG. 2 is about 5 volts removed from line A and is the consequence of having to maintain at least a minimum voltage across the tip and ring amplifier circuits 20 and 40 to ensure linear a.c. signal operation.

The addition of the d.c. feed control circuit in place of the typical d.c. feedback network modifies the operation of the line feed circuit to be similar to that illustrated by either of lines C or D in FIG. 2. The tip and ring amplifier circuits 20 and 40 continue to be operated to yield a predetermined a.c. terminating impedance at the tip and ring terminals 2 and 3 in response to signals from the output of the control circuit 60 coupled via the first resistive signal path including the resistor 26. The second resistive signal path provides substantially no a.c. input signal to the tip amplifier circuit 20 owing to the effect of the capacitor 207 which bypasses a.c. signals to ground. The output direct current incremental resistances of the tip and ring amplifiers 20 and 40 are variable from nearly zero ohms toward infinity to maintain a preferred approximately 40 milliamperes of energizing direct current for operation of most any one of various two wire communication lines. The direct energizing current is caused to be limited by the clamping action of the diode 205. The nearly vertical portions of the lines C and D in FIG. 2 correspond to operating characteristics of active impedance line circuits with 100 and 50 ohm feed resistors respectively, during operation with a communication line of longer length than most. In the case of the communication line having a slightly higher resistance in the OFF HOOK state than can be supplied with 40 milliamperes from a battery of about 50 volts, the feed energizing current flows in the tip and ring feed resistors 12 and 13 are less than normal, and the voltage at the terminal 4 is thus higher than normal. In response to the higher voltage the diode 205 is no longer forward biased therefore letting the voltage at the junction of the resistors 201 and 202 vary in a positive direction. In this condition the resistors 201, 202 and 203 in the second resistive signal path act as an attenuator for signals from the output of the control circuit 60. This second signal path is completed by the resistor 78b which terminates at the inverting input of the tip amplifier circuit 20. In this example the attenuation in the first and second resistive signal paths is about the same. Thus a direct current signal from the control circuit 60 is applied in common mode across the inverting and non-inverting inputs of the tip amplifier circuit 20 and effects an almost zero ohms direct current incremental resistance at the output of the tip amplifier circuit 20. The ring amplifier circuit 40 being controlled from the output of the tip amplifier circuit 20 exhibits a similar output direct current incremental resistance.

In the example embodiment preferred performance has been achieved with circuit values as listed in the following table:

| Element | | Value |
|---|---|---|
| Resistor | 26 | 100K ohms |
| | 27 | 100K ohms |
| | 78a | 280K ohms |
| | 78b | 200K ohms |
| | 81 | 330K ohms |
| | 201 | 150K ohms |
| | 202 | 60K ohms |
| | 203 | 100K ohms |
| Capacitor | 78c | 3.3 nanofarads |
| | 207 | 0.1 microfarads |

Operating potential for +V1, +V2 and VREF are 8 volts, 12 volts and minus 25 volts respectively.

The active impedance line feed circuit yields circuit performance which at least equals that of passive feed circuits at a minimum preferred energizing direct current flow. The active impedance line circuit may be optimized for communication lines of slightly higher resistance than that illustrated by simply reducing the ohmic values of the tip and ring feed resistors. Lower value for the tip and ring feed resistors 12 and 13 is particularly attractive in the case of the instant invention being used with the transformer assisted active impedance line feed circuit as dislosed in the previously mentioned patent application Ser. No. 406,115, filed Aug. 6, 1982. However any reduction in the value of the tip and ring feed resistors 12 and 13 must be consistent with providing adequate voltage signals at the tip and ring voltage taps for satisfactory operation of the control circuit 60.

What is claimed is:

1. An active impedance line feed circuit for supplying energizing direct current and alternating current signals to a pair of leads in a communication line comprising:
   a pair of tip and ring line terminals for connection to the communication line;
   a receive signal terminal for receiving a.c. signal information destined for the communication line;
   tip and ring amplifiers each having an output for conducting tip and ring currents respectively;
   a resistance network including tip and ring feed resistors being of similar ohmic values, the tip feed resistor being connected in series with the output of the tip amplifier and the tip terminal, and the ring feed resistor being connected in series with the output of the ring amplifier and the ring terminal, and tip and ring voltage dividers defining tip and ring voltage taps respectively;
   a control circuit having an output and having a differential input being connected across the tip and ring voltage taps;
   in combination with one of the tip and ring amplifiers;
   a first resistive signal path being connected between the output of the control circuit and a non-inverting input of the amplifier;
   an a.c. feedback network being connected between the output of the amplifier and an inverting input of the amplifier;
   a d.c. feed control network comprising first and second resistors being connected in series between the output of the amplifier and the output of the control circuit and defining a junction therebetween, a unidirectional conductive device connected to the junction for preventing a potential of the junction from being less than a predetermined voltage, the junction being a.c. grounded via a capacitive element and being resistively connected to a bias voltage source of a potential greater than the predetermined potential and being resistively connected to the inverting input of the amplifier;
   the second resistor and the junction comprising part of a second resistive signal path which in combination with the first resistive signal path, couple signals of frequencies below voice band frequencies and including direct current are applied in common mode configuration across the inputs of the amplifier in an instant of the unidirectional conductive device being non conductive.

2. An active impedance line feed circuit as defined in claim 1 wherein said one of the amplifiers is the tip amplifier, and the unidirectional conductive device is a diode having a cathode electrode connected to the junction of the first and second resistors.

3. An active impedance line feed circuit as defined in claim 2 wherein the diode includes an anode electrode being connected to ground and wherein the potential of the bias voltage source is positive.

4. An active impedance line feed circuit as defined in claim 2 wherein the a.c. feedback network comprises:
   a third resistor being connected at the output of the tip amplifier, a fourth resistor being connected to the junction of the first and second resistors and a capacitor being connected in series between the third and fourth resistors, a junction of the capacitor and the fourth resistor being connected to the inverting input of the tip amplifier;

whereby a ratio of values of the third and fourth resistors substantially determines the effective a.c. output impedance of the amplifiers and the fourth resistor and the second resistor provide the second resistive signal path.

5. An active impedance line feed circuit as defined in claim 1 wherein the a.c. feedback network comprises:

a third resistor being connected to the output of the amplifier, a fourth resistor being connected to the junction of the first and second resistors and a capacitor being connected in series between the third and fourth resistors, a junction of the capacitor and the fourth resistor being connected to the inverting input of the amplifier;

whereby a ratio of values of the third and fourth resistors substantially determining the effective a.c. output impedance of the amplifiers and the fourth resistor and the second resistor provide the second resistive signal path.

6. An active impedance line feed circuit including terminals for connecting a source of operating voltage thereto, tip and ring amplifier circuits having outputs being connected via tip and ring feed resistors to tip and ring feed terminals and a control circuit for generating a control signal being proportional to a sum of differential currents flowing via the tip and ring feed resistors, the tip and ring amplifiers being operable for supplying a communication line connected at the tip and ring terminals with direct energizing current in response to the control signal, the line feed circuit being characterized in that:

one of the tip and ring amplifier circuits comprises:

a first differential amplifier having inverting and non-inverting inputs and an output, the non-inverting input being resistively connected to an output of the control circuit, an a.c. feedback network being connected between an output of the first differential amplifier and the inverting input for causing the first differential amplifier circuit to operate with a predetermined output impedance, a d.c. feed control network being connected between the output and the inverting input of the differential amplifier and being resistively connected to the output of the control circuit, for causing the first differential amplifier circuit to have output characteristics consistent with conducting a substantially constant direct energizing current of a predetermined amount via the associated feed resistor in a case where a first value, being the operating voltage less a constant of at least twice a minimum potential required for linear operation of the differential amplifier, divided by a second value, being a sum of the operating resistance of the communication line in an OFF HOOK condition and the resistances of the tip and ring feed resistors, is greater than the predetermined amount; and the other of the tip and ring amplifier circuits comprising:

a second differential amplifier similar to the first differential amplifier and having an output and an inverting input, the inverting input of the second differential amplifier being resistively connected to the output of the first differential amplifier whereby the second differential amplifier operates with an output characteristic similar to the output characteristic of the first differential amplifier.

7. A method of operating an active impedance line feed circuit wherein tip and ring amplifiers are maintained in linear operation and controlled in response to differential currents in a communication line to exhibit in series combination with respective tip and ring feed resistors a predetermined characteristic source impedance, as defined by an a.c. feedback network in the active impedance line circuit, for coupling a.c. signals to the communication line, the method being characterized by the steps of:

controlling incremental direct current resistance characteristics at the outputs of the tip and ring amplifiers to be similar one with respect to the other and to be of such value as to provide in series with a power source a substantially constant predetermined direct energizing current for operation of the communication line; and in an instant wherein a resistance of the communication line is too high to maintain the predetermined direct energizing current, as a consequence of a voltage available from the power source being insufficient, controlling the incremental direct current resistance characteristics at the outputs of the tip and ring amplifiers to approach zero ohms with respect to an apparent power source voltage corresponding to the available voltage from the power source less at least a minimum voltage required for said linear operation of the tip and ring amplifiers, such that the source resistance of direct energizing current is reduced to approach in effect the sum of the resistances of the tip and ring feed resistors in said instance of too high communication line resistance;

whereby in accordance with the characterized method a length of communication line being energizable with at least a predetermined minimum direct energizing current from an active impedance line feed circuit is extended.

* * * * *